(12) United States Patent
Chae et al.

(10) Patent No.: US 8,284,352 B2
(45) Date of Patent: Oct. 9, 2012

(54) LIQUID CRYSTAL DISPLAY PANEL AND METHOD FOR FABRICATING THE SAME

(75) Inventors: Gee Sung Chae, Incheon-si (KR); Jin Wuk Kim, Uiwang-si (KR)

(73) Assignee: LG Display, Ltd., Seoul (KR)

( * ) Notice: Subject to any disclaimer, the term of this patent is extended or adjusted under 35 U.S.C. 154(b) by 1319 days.

(21) Appl. No.: 12/005,619

(22) Filed: Dec. 28, 2007

(65) Prior Publication Data

US 2008/0252829 A1  Oct. 16, 2008

(30) Foreign Application Priority Data

Apr. 16, 2007 (KR) .................. 10-2007-0036877

(51) Int. Cl.
*G02F 1/1335* (2006.01)
(52) U.S. Cl. ...................... 349/106; 349/108
(58) Field of Classification Search .............. None
See application file for complete search history.

(56) References Cited

U.S. PATENT DOCUMENTS

| 5,642,176 | A  * | 6/1997  | Abukawa et al. | 349/106 |
|---|---|---|---|---|
| 7,742,128 | B2 * | 6/2010  | Asao | 349/106 |
| 2001/0026347 | A1 * | 10/2001 | Sawasaki et al. | 349/156 |
| 2003/0082465 | A1 * | 5/2003  | Takizawa | 430/7 |
| 2004/0212762 | A1 * | 10/2004 | Yeh et al. | 349/110 |
| 2005/0122445 | A1 * | 6/2005  | Park et al. | 349/106 |
| 2007/0008462 | A1 * | 1/2007  | Yang et al. | 349/106 |
| 2007/0115405 | A1 * | 5/2007  | Kazuyoshi | 349/107 |

* cited by examiner

*Primary Examiner* — Thanh-Nhan P Nguyen
(74) *Attorney, Agent, or Firm* — McKenna, Long and Aldridge, LLP.

(57) ABSTRACT

Disclosed herein are a liquid crystal display panel and a method for fabricating the same wherein color reproducibility and superior image quality are achieved. The liquid crystal display panel comprises a color filter array substrate including a black matrix and a plurality of color filters arranged on a substrate, wherein each of the color filter includes a first color filter, a second color filter and a third color filter, each of them yielding a different color; and at least one selected from a fourth color filter yielding a mixed color of the first and second color filters, a fifth color filter yielding a mixed color of the second and third color filters, and a sixth color filter yielding a mixed color of the first and third color filters.

6 Claims, 21 Drawing Sheets

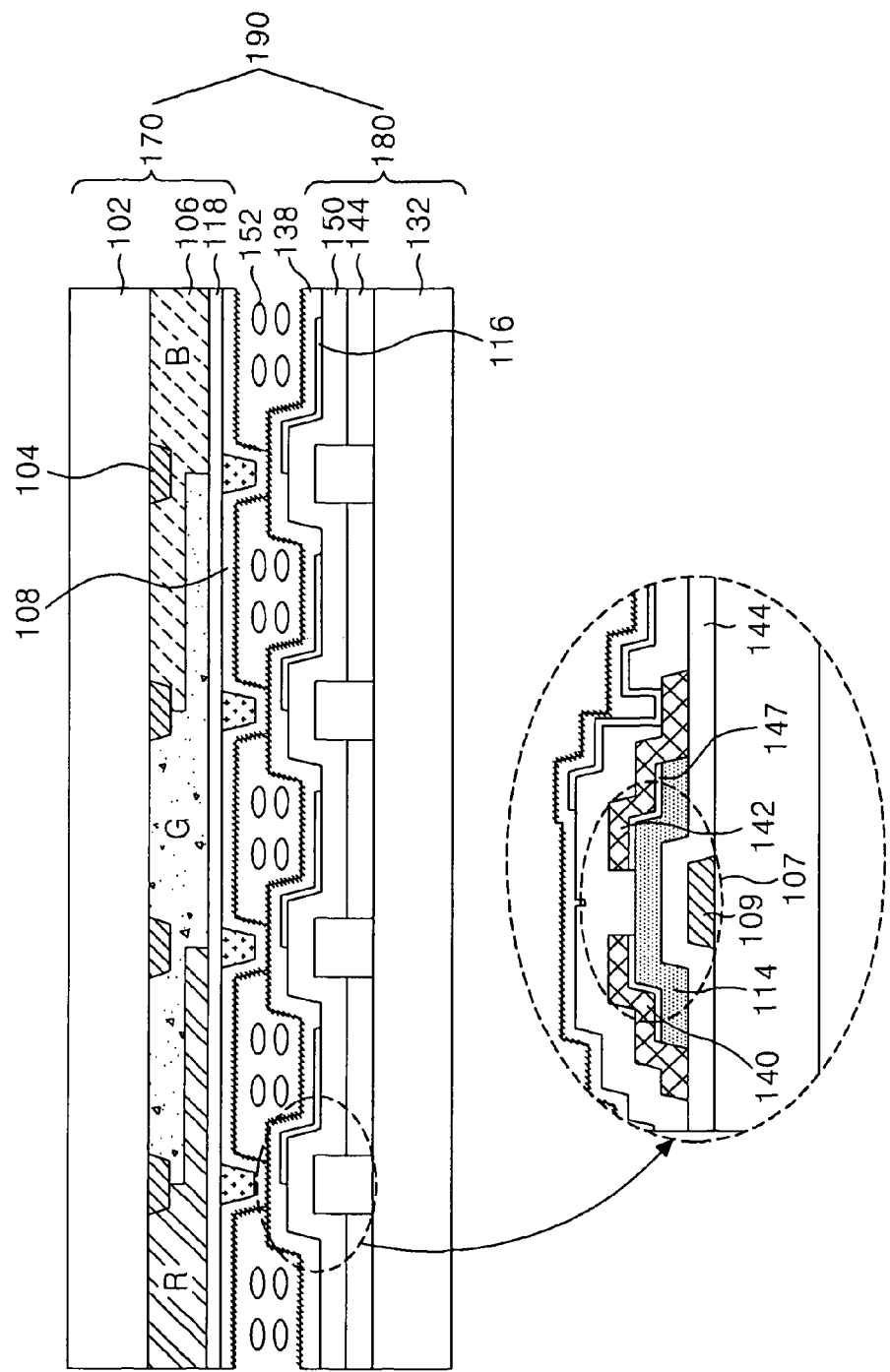

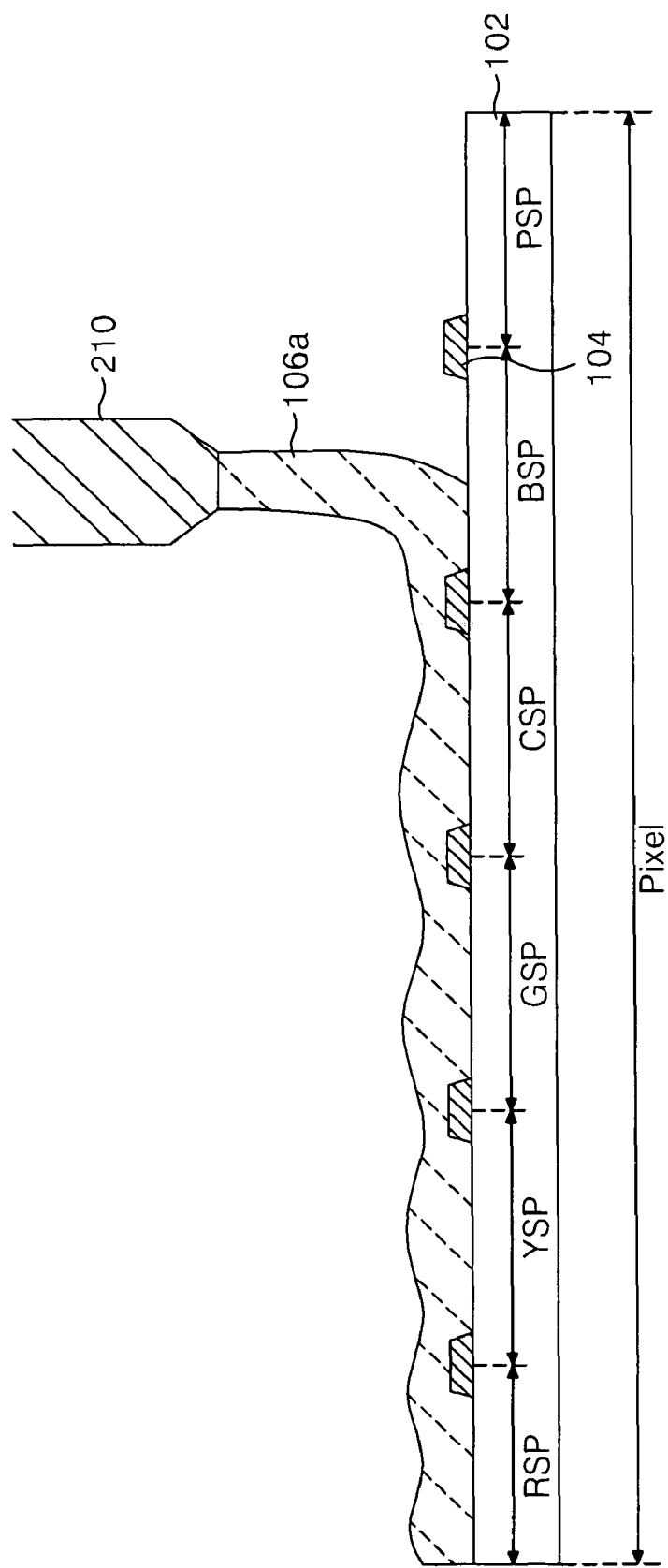

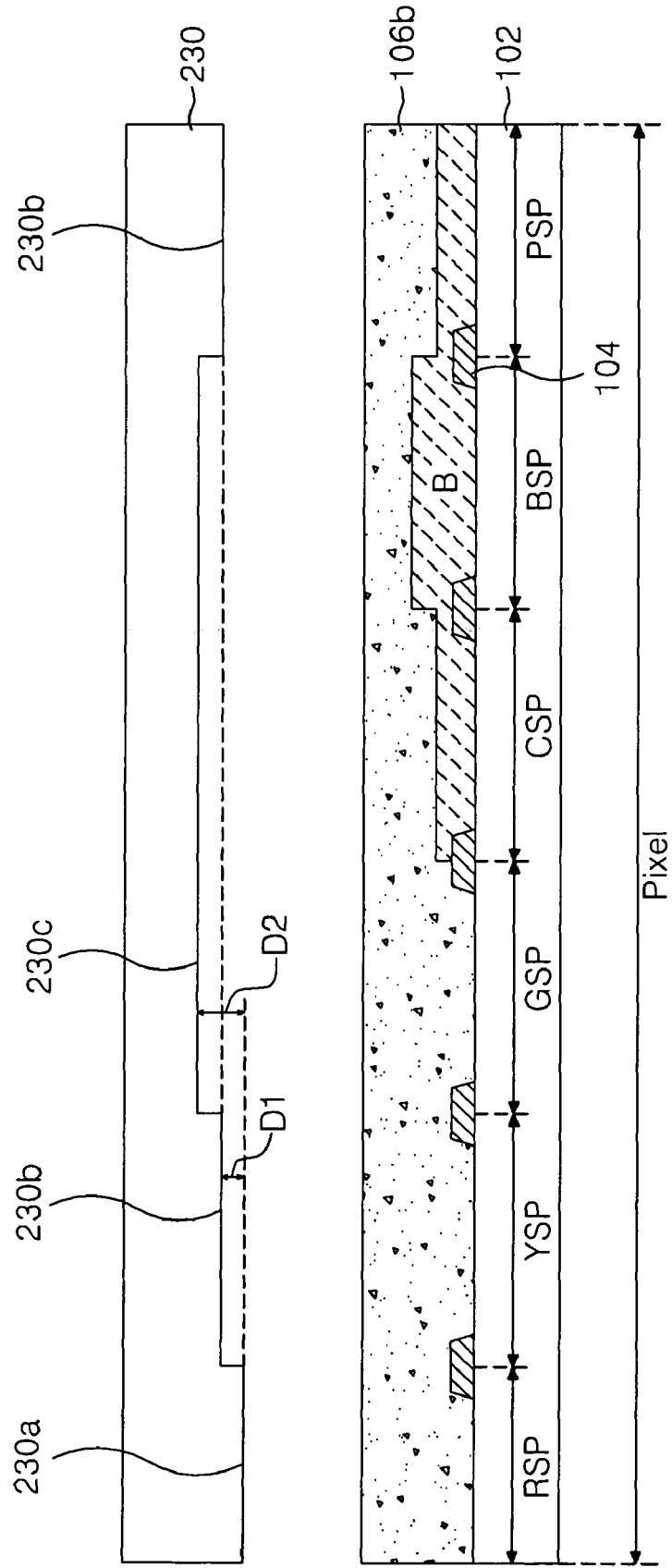

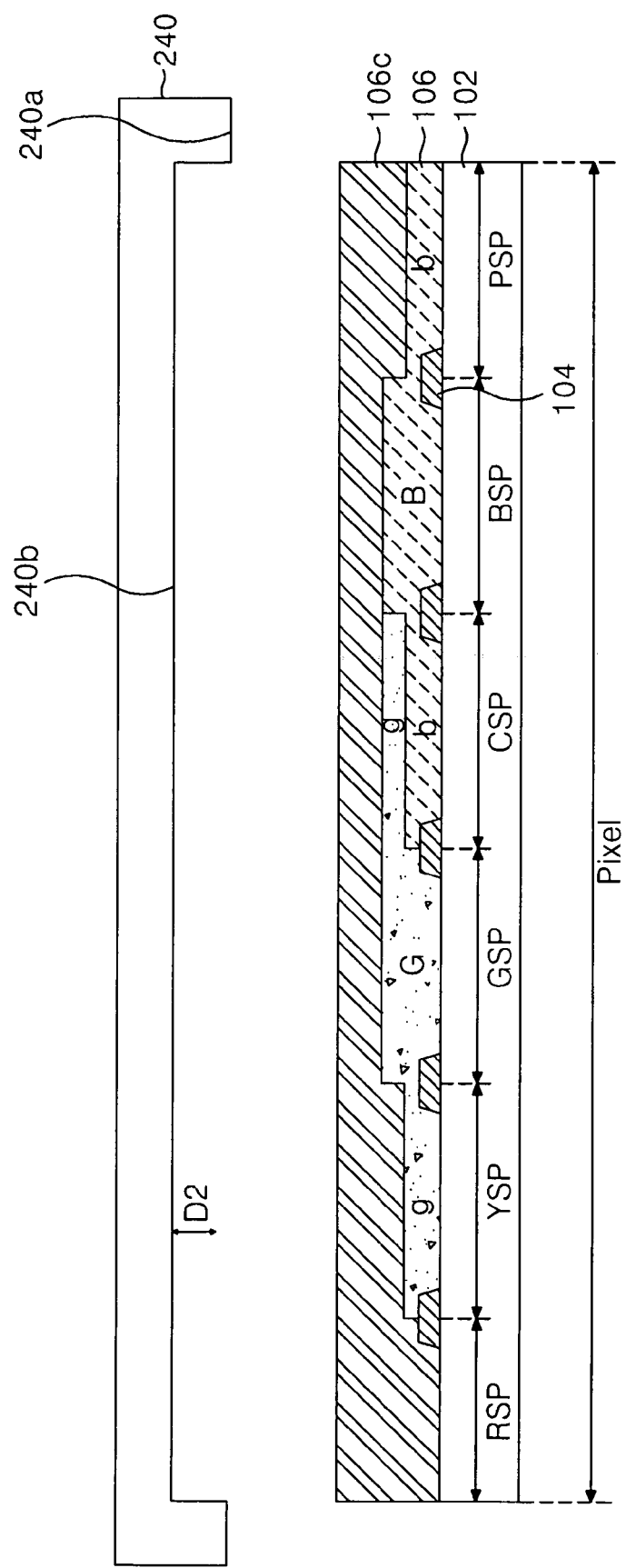

LIQUID CRYSTAL DISPLAY PANEL AND METHOD FOR FABRICATING THE SAME

This application claims the benefit of Korean Patent Application No. 10-2007-0036877, filed in Korea on Apr. 16, 2007, which is hereby incorporated by reference for all purposes as if fully set forth herein.

BACKGROUND OF THE INVENTION

1. Field of the Invention

The present invention relates to a liquid crystal display panel, and more particularly, to a liquid crystal display panel with improved color reproducibility, and a method for fabricating the same.

2. Discussion of the Related Art

Liquid crystal display devices (LCDs) control light transmittance of liquid crystal cells, arranged in a matrix, according to a video signal to enable the liquid crystal cells to display an image corresponding to the video signal on a liquid crystal display panel. In order to display images, liquid crystal display devices (LCDs) include a liquid crystal display panel, where liquid crystal cells are arranged in the form of an active matrix, and a driving circuit to drive the liquid crystal panel.

FIG. 1 is a sectional view illustrating a related art liquid crystal display panel 90.

As shown in FIG. 1, the liquid crystal display panel 90 includes a color filter array substrate 70 which consists of a black matrix 4, a color filter 6, a common electrode 18 and an upper alignment layer 8 formed in this order on an upper substrate 2. The liquid crystal display panel 90 also includes a thin film transistor array substrate 80 which consists of a thin film transistor 7, a pixel electrode 16, and a lower alignment layer 38 arranged on a lower substrate 32. The liquid crystal display panel 90 also includes liquid crystal material 52 interposed in the space between the color filter array substrate 70 and the thin film transistor array substrate 80.

In the color filter array substrate 70, the black matrix 4 helps to prevent light leakage and increase contrast by absorbing external light. The color filter 6 consists of red (R), green (G), and blue (B) (blue not illustrated) filters, which produce red, green and blue colors, respectively. The common electrode 18 receives a common voltage and contributes to controlling the motion of liquid crystals. At least a spacer 13 maintains the cell gap between the color filter array substrate 70 and the thin film transistor array substrate 80.

In the thin film transistor array substrate 80, the thin film transistor 7 includes: a gate electrode 9 arranged together with a gate line (gate line not shown) on the lower substrate 32, semiconductor layers 14 and 47 overlapping the gate electrode 9 and a gate insulating film 44 that is beneath the semiconductor layers 14 and 47; and a source electrode 40 and a drain electrode 42 arranged together with the gate line (gate line not shown) between the semiconductor layers 14 and 47. The thin film transistor 7 supplies a pixel signal through a data line to a pixel electrode 16, in response to a scanning signal through the gate line. The pixel electrode 16 may be made of a transparent conductive material with high light-transmittance and is in electrical contact with the drain electrode 42 of the thin film transistor 7 through a passivation film 50. Upper and lower alignment layer 8 and 38 aid in the alignment of liquid crystal and may be formed by application of an alignment material such as polyimide, followed by a step of rubbing, for example.

FIGS. 2A through and including 2F are sectional views sequentially illustrating a method for fabricating a color filter array substrate of a related art liquid crystal display panel.

First, an opaque resin is applied to an upper substrate 2 by deposition such as sputtering, and is then patterned by photolithographic and etching processes using a first mask, to form a black matrix 4, as shown in FIG. 2A. The black matrix 4 may be composed of a material such as chrome (Cr), for example.

A red color resin is deposited on the upper substrate 2 including the black matrix 4, and is then patterned by photolithographic and etching processes using a second mask, to form a red color filter R, as shown in FIG. 2B.

A green color resin is deposited on the upper substrate 2 including the resulting structure, and is then patterned by photolithographic and etching processes using a third mask, to form a green color filter G, as shown in FIG. 2C. A blue color resin is deposited on the upper substrate 2 including the resulting structure, and is then patterned by photolithographic and etching processes using a fourth mask, to form a blue color filter B, as shown in FIG. 2D. As a result, red, green and blue color filters 6 are formed.

A transparent conductive material is deposited over the entire surface of the upper substrate 2 including red, green and blue color filters, to form a common electrode 18, as shown in FIG. 2E.

An organic or inorganic insulating material is deposited on the upper substrate 2 including the common electrode 18 and is then patterned by photolithographic and etching processes using a fifth mask, to form column spacers 13, as shown in FIG. 2F.

As such, at least five mask processes are required for the fabrication of the color filter array substrate 70 of the related art liquid crystal display panel 90. Each of the mask processes includes a photolithographic process, which is a photographic process involving a series of steps including application of a photoresist, mask alignment, light exposure and development. Such a photolithographic process requires a lot of time, consumes a tremendous amount of developing solution used to develop the photoresist and patterns thereof, and requires expensive equipment such as exposure equipment, thus disadvantageously making a liquid crystal display panel fabrication process time consuming, complex and expensive.

SUMMARY OF THE INVENTION

Accordingly, the present invention is directed to a liquid crystal display panel and a method for fabricating the same that substantially obviate one or more problems due to limitations and disadvantages of the related art.

An advantage of the present invention is to provide a liquid crystal display (LCD) panel capable of reducing fabrication costs while exhibiting improved color reproducibility and thus superior image quality, and a method for fabricating the same.

Additional advantages and features of the invention will be set forth in part in the description which follows and will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages, and in accordance with the purpose of the invention, as embodied and broadly described herein, a liquid crystal display panel comprises: a color filter array substrate including a black matrix and a plurality of color filters arranged on a substrate, wherein each of the color filters includes a first color filter, a second color filter and a third color filter, each color filter yielding a different color; and at least one selected from a fourth color filter yielding a mixed color of the first and second color filters, a fifth color filter yielding a mixed color of the second and third color filters, and a sixth color filter yielding a mixed color of the first and third color filters.

The fourth color filter may be arranged between the first and second color filters, the fifth color filter may be arranged between the second and third color filters, and the sixth color filter may be arranged between the first and third color filters.

The fourth color filter includes a dummy first color filter and a dummy second color filter. The dummy first color filter extends from the first color filter and is thinner than that of the first color filter. The dummy second color filter extends from the second color filter, is thinner than that of the second color filter and overlaps the dummy first color filter.

The fifth color filter includes a dummy second color filter and a dummy third color filter. The dummy second color filter extends from the second color filter and is thinner than that of the second color filter. The dummy third color filter extends from the third color filter, is thinner than that of the third color filter and overlaps the dummy second color filter.

The sixth color filter includes a dummy first color filter and a dummy third color filter. The dummy first color filter extends from the first color filter and is thinner than that of the first color filter. The dummy third color filter extends from the third color filter, is thinner than that of the third color filter and overlaps the dummy first color filter.

The dummy first color filter, the dummy second color filter and the dummy third color filter may be about half the thickness of the first to third color filters, respectively.

The first color filter may yield red, the second color filter may yield green, the third color filter may yield blue, the fourth color filter may yield yellow, the fifth color filter may yield cyan, and the sixth color filter may yield pink.

The color filter array substrate may further include a common electrode arranged on the color filter and at least a spacer arranged on the common electrode.

The liquid crystal display panel may further comprise: a thin film transistor array substrate joined to the color filter array substrate such that liquid crystal is interposed between the two substrates, wherein the thin film transistor array substrate includes a thin film transistor and a pixel electrode contacting the thin film transistor.

In another aspect of the present invention, a method for fabricating a liquid crystal display panel comprises: forming a black matrix on a substrate; and forming a color filter over the substrate including the black matrix, wherein the step of forming a color filter includes: forming first, second and third color filters, each of them yielding a different color; and forming at least one selected from a fourth color filter yielding a mixed color of the first and second color filters, a fifth color filter yielding a mixed color of the second and third color filters, and a sixth color filter yielding a mixed color of the first and third color filters.

The step of forming the color filter may include: forming the first color filter and the dummy first color filter by applying a liquid first color resin onto the substrate including the black matrix and pressing the first color resin using a first soft mold; forming the second color filter, the dummy second color filter and the fourth color filter by applying a liquid second color resin onto the substrate including the resulting structure and pressing the second color resin using a second soft mold; and forming the third color filter, the fifth color filter and the sixth color filter by applying a liquid third color resin onto the substrate including the resulting structure and pressing the third color resin using a third soft mold.

The step of forming the first color filter and the dummy first color filter may include: preparing a first soft mold having a base side, a first concave side depressed to a first depth from the base side, and a second concave side depressed to a second depth from the base side; aligning the first soft mold over the first color resin; pressing the first soft mold under a pressure corresponding to the weight of the first soft mold, or a mechanical pressure; curing the first soft mold using ultraviolet radiation; and separating the first soft mold from the substrate to form the dummy first color filter having the same thickness as the first depth and the first color filter having the same thickness as the second depth.

The step of forming the second color filter, the dummy second color filter and the fourth color filter may include: preparing a second soft mold having a base side, a first concave side depressed to a first depth from the base side, and a second concave side depressed to a second depth from the base side; aligning the second soft mold over the second color resin; pressing the second soft mold under a pressure corresponding to the weight of the second soft mold or a mechanical pressure; curing the second soft mold using ultraviolet radiation; and separating the second soft mold from the substrate to form the dummy second color filter having the same thickness as the first depth and the fourth color filter having the same thickness as the second depth.

The step of forming the third color filter, the fifth color filter and the sixth color filter may include: preparing a third soft mold having a base side, and a first concave depressed to a second depth from the base side; aligning the third soft mold over the third color resin; pressing the third soft mold under a pressure corresponding to the weight of the third soft mold or a mechanical pressure; curing the third soft mold using ultraviolet radiation; and separating the third soft mold from the substrate to form the third, fifth and sixth color filters, each having the same thickness as the first depth.

The liquid first to third color resins may include an activator and an initiator.

The first to third soft molds may further include at least one selected from polydimethylsiloxane (PDMS), polyurethane acrylate (PUA) and cross-linked novolac resins or other suitable materials.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention.

In the drawings:

FIG. 3 is a sectional view illustrating a liquid crystal display panel according to the present invention;

DETAILED DESCRIPTION OF THE ILLUSTRATED EMBODIMENTS

Figure 1:
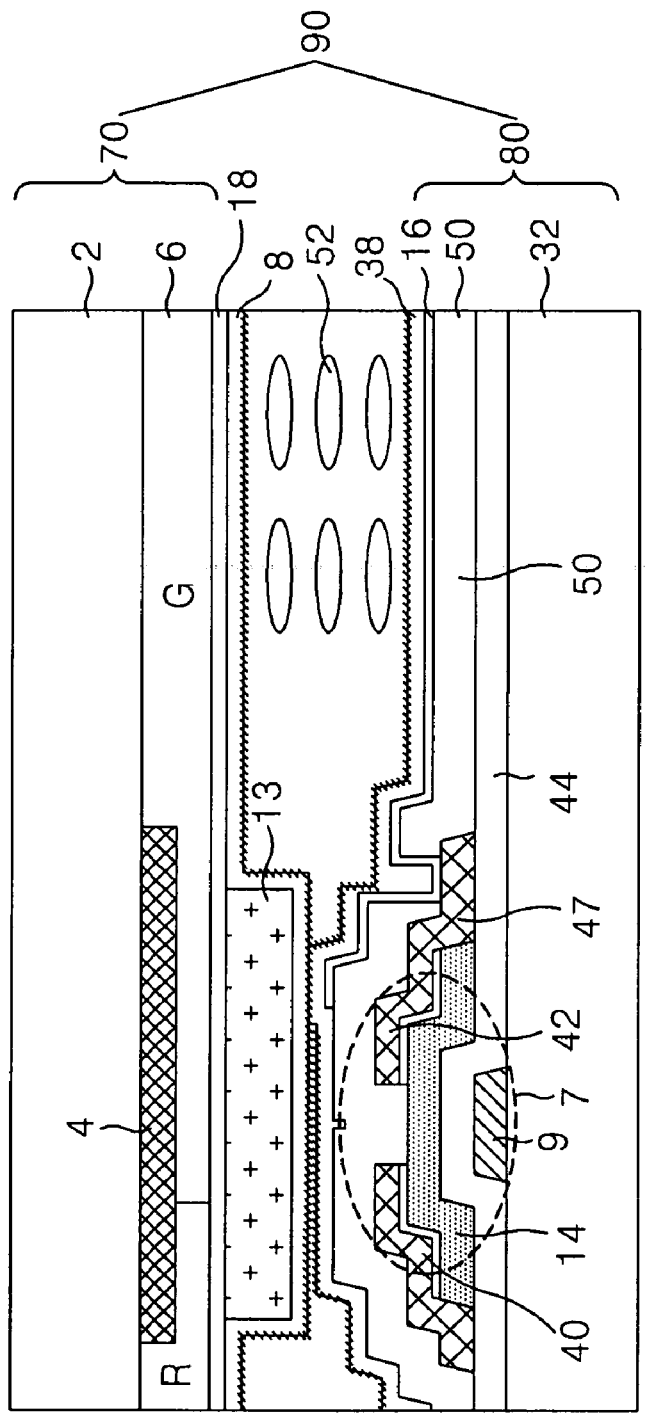
FIG. 1 is a sectional view illustrating a related art liquid crystal display panel.
Figure 2A:
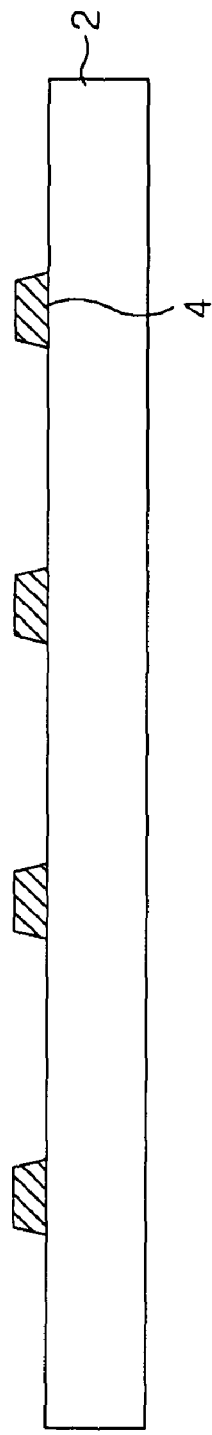
FIGS. 2A through and including 2F are sectional views sequentially illustrating a process for fabricating a color filter array substrate of a related art liquid crystal display panel.
Figure 2B:
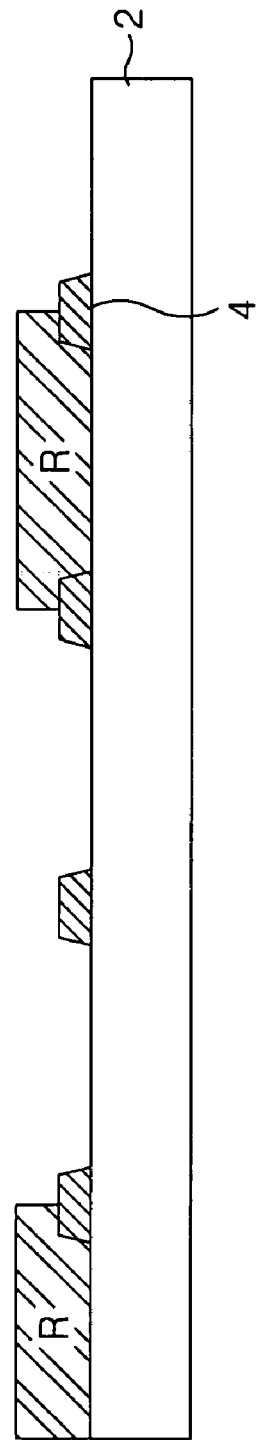
Figure 2C:
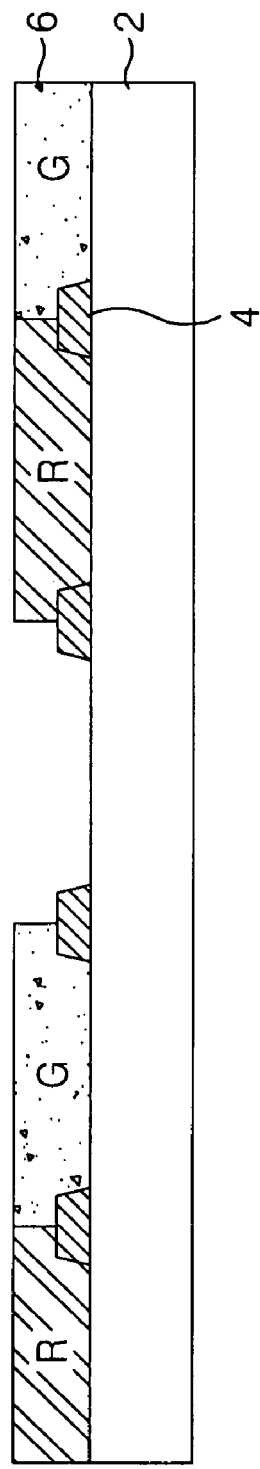
Figure 2D:
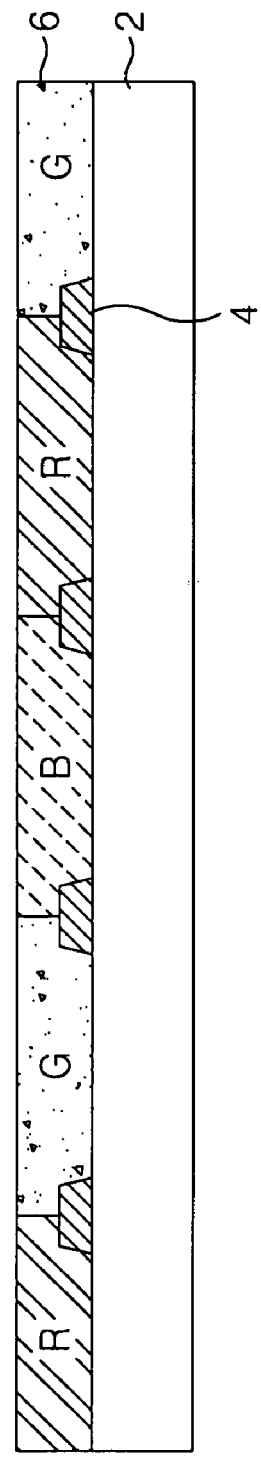
Figure 2E:
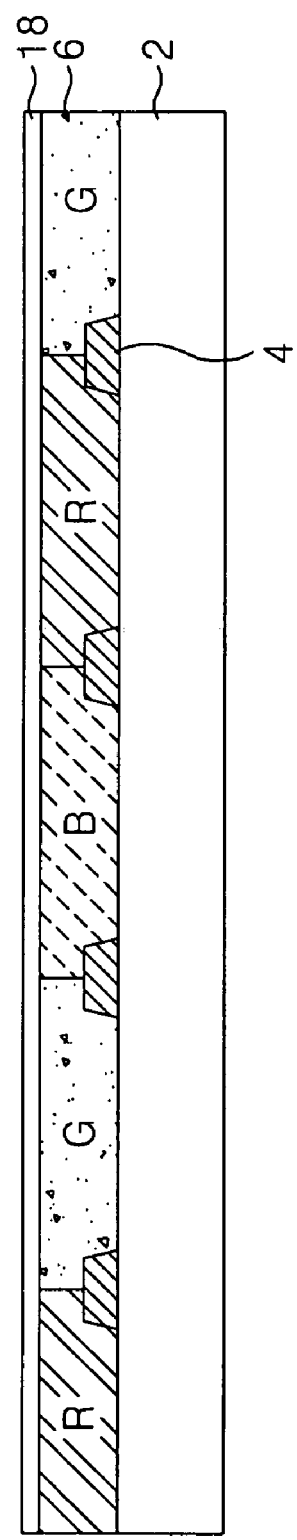
Figure 2F:
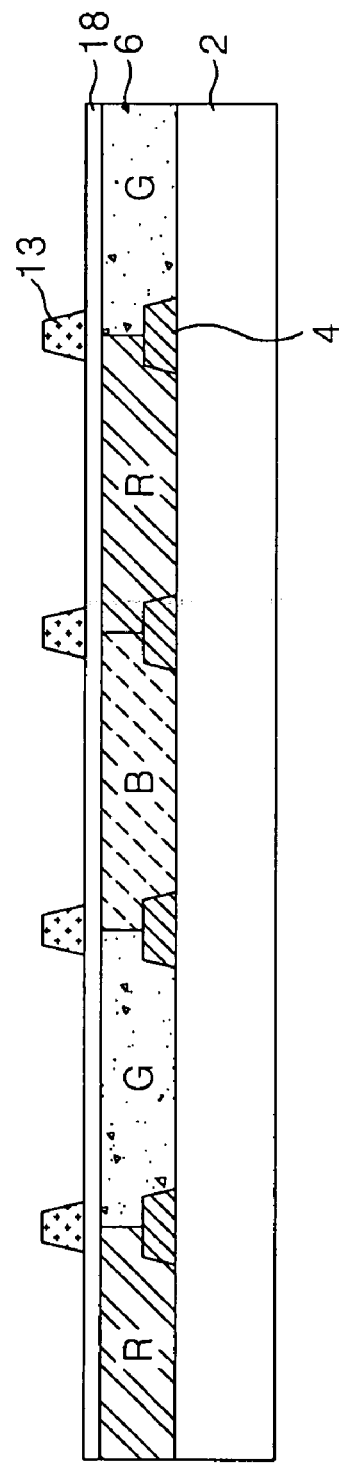

Reference will now be made in detail to embodiments of the present invention associated with an LCD device and a method for manufacturing the same according to the present invention, examples of which are illustrated in the accompanying drawings. Wherever possible, the same reference numbers will be used throughout the drawings to refer to the same or like parts.

Referring to FIGS. 3 to 6H, embodiments of the present invention will be described.

FIG. 3 is a sectional view illustrating a liquid crystal display panel 190 according to the present invention.

As shown in FIG. 3, the liquid crystal display panel 190 includes a color filter array substrate 170 which includes a black matrix 104, a color filter 106, a common electrode 118 and an upper alignment layer 108 formed in this order on an upper substrate 102. The liquid crystal display panel 190 also includes a thin film transistor array substrate 180 which includes a thin film transistor 107, a pixel electrode 116 and a lower alignment layer 138 arranged on a lower substrate 132. The liquid crystal display panel 190 also includes liquid crystal 152 interposed in the space between the color filter array substrate 170 and the thin film transistor array substrate 180.

In the thin film transistor array substrate 180, the thin film transistor 107 includes: a gate line (not shown) and a gate electrode 109 arranged on the lower substrate 132; a gate insulating film 144 on the lower substrate 132 including the gate electrode 109; semiconductor layers 114 and 147 overlapping the gate electrode 109 on the gate insulating film 144; and a source electrode 140 and a drain electrode 142 arranged together with a data line (not shown) at both sides of the semiconductor layers 114 and 147. The thin film transistor 107 supplies a pixel signal through the data line to the pixel electrode 116, in response to a scanning signal through the gate line. The pixel electrode 116 is made of a transparent conductive material with a high light-transmittance and contacts the drain electrode 142 of the thin film transistor 107 through a contact hole formed in a passivation film 150. The upper and lower alignment layers 108 and 138, respectively, aid in the alignment of liquid crystal and may be formed by application of an alignment material such as polyimide, followed by a step of rubbing, for example.

In the color filter array substrate 170, the black matrix 104 is arranged on the upper substrate 102 in a region corresponding to the thin film transistor 107 and the gate and data lines (not shown) on the thin film transistor array substrate 180. The black matrix 104 corresponds to a pixel region where the color filter 106 layer is formed. The black matrix 104 prevents light leakage and increases contrast by absorbing external light.

Figure 4:
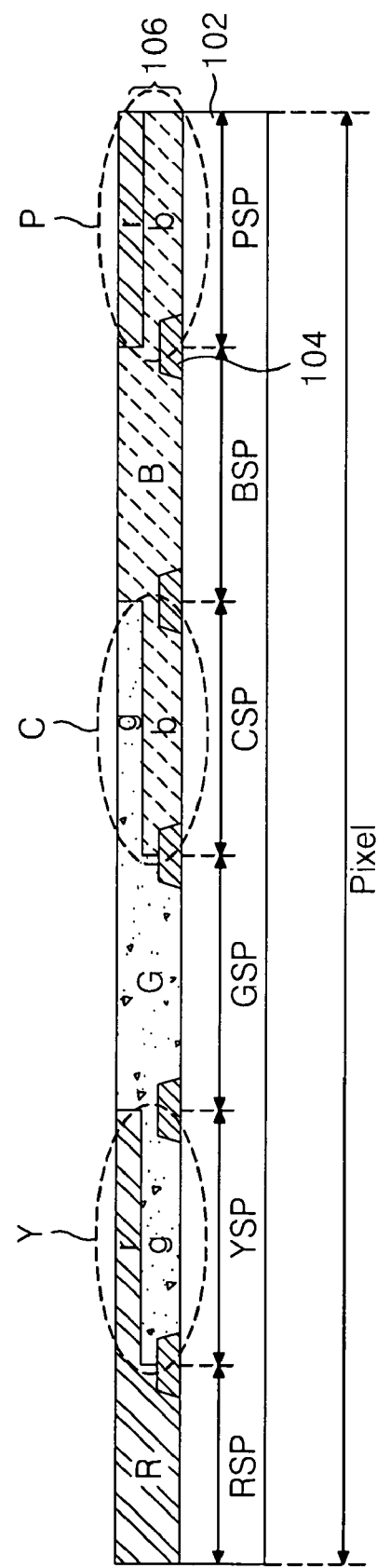
FIG. 4 is a sectional view more specifically illustrating the color filter shown in FIG. 3.

The color filter 106 consists of a red color filter R, a green color filter G and a blue color filter B. The color filter 106 may further include: a yellow color filter Y provided by the partial overlap between the red color filter R and the green color filter G (as seen in FIG. 4); a cyan color filter C provided by the partial overlap between the green color filter G and the blue color filter B (as seen in FIG. 4); and a pink color filter P provided by the partial overlap between the red color filter R and the blue color filter B (as seen in FIG. 4). Accordingly, the liquid crystal display panel of the present invention is capable of exhibiting improved color reproducibility, as compared to a related art liquid crystal display panel which includes only red, green and blue color filters R, G and B, respectively.

Referring to FIG. 4, a more detailed explanation associated with the color filter of the present invention is presented below.

Each of a plurality of pixels forming the liquid crystal display panel includes a red sub pixel RSP, a green sub pixel GSP and a blue sub pixel BSP. Further, each pixel forming the liquid crystal display panel according to the present invention, includes in addition to a red sub pixel RSP, a green sub pixel GSP and a blue sub pixel BSP, further includes at least one selected from a cyan sub pixel CSP, a yellow sub pixel YSP and a pink sub pixel PSP. In sum, one pixel of the present invention includes 4 to 6 sub pixels.

The cyan sub pixel CSP includes a cyan color filter C to yield cyan, the yellow sub pixel YSP includes a yellow color filter Y to yield yellow, and the pink sub pixel PSP includes a pink color filter P to yield pink.

The cyan color filter C is interposed between the green color filter G and the blue color filter B. The cyan color filter C is formed by overlapping a dummy green color filter "g" having half the thickness of the green color filter G, with a dummy blue color filter "b" having half the thickness of the blue color filter B. The dummy green color filter "g" extends from the adjacent green color filter G and the dummy blue color filter "b" extends from the adjacent blue color filter B.

The yellow color filter Y is interposed between the red color filter R and the green color filter G. The yellow color filter Y is formed by overlapping a dummy red color filter "r" having half the thickness of the red color filter R, with a dummy green color filter "g" having half the thickness of the green color filter G. The dummy red color filter "r" extends from the adjacent red color filter R and the dummy green color filter "g" extends from the adjacent green color filter G.

The pink color filter P is interposed between the red color filter R and the blue color filter B (wherein the sequence of R, G, B color filters extends beyond that shown in FIG. 4). The pink color filter P is formed by overlapping a dummy red color filter "r" having half the thickness of the red color filter R, with a dummy blue color filter "b" having half the thickness of the blue color filter B. The dummy red color filter "r" extends from the adjacent red color filter R and the dummy blue color filter "b" extends from the adjacent blue color filter B.

Therefore, the color filter 106 in the liquid crystal display panel of the present invention includes at least one selected from the cyan sub pixel CSP, the yellow sub pixel YSP and the pink sub pixel PSP, in addition to the red sub pixel RSP, the green sub pixel GSP and the blue sub pixel BSP. As a result, the liquid crystal display panel of the present invention is capable of exhibiting improved color reproducibility and therefore realizing superior image quality, as compared to a related art liquid crystal display panel in which an image is produced by a combination of RSP, GSP and BSP subpixels only.

Referring to FIG. 3, the common electrode 118 arranged on the color filter 106 receives a common voltage to control liquid crystal motion. The spacer 113 maintains the cell gap between the color filter array substrate 170 and the thin film transistor array substrate 180.

FIGS. 5A through 5D are sectional views sequentially illustrating a process for fabricating the color filter array substrate 170 of the liquid crystal display panel 190 shown in FIG. 3.

Figure 5A:
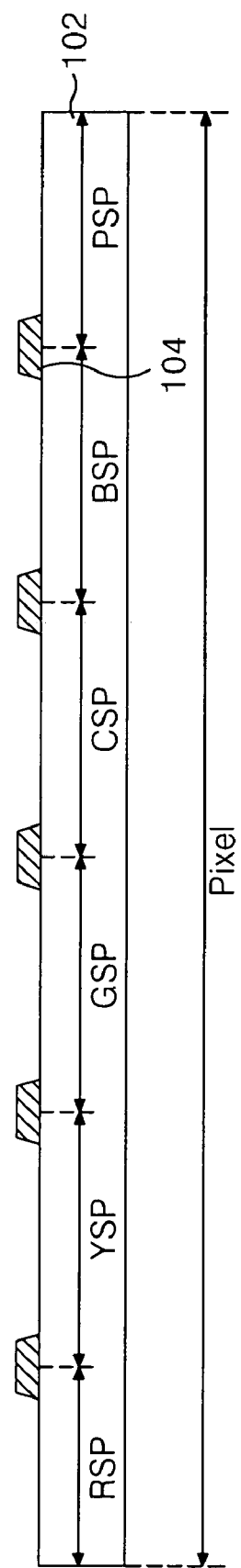
FIGS. 5A through and including 5D are sectional views sequentially illustrating a process for fabricating the color filter array substrate of the liquid crystal display panel shown in FIG. 3.

First, an opaque resin or a metal is applied to an upper substrate 102 by deposition such as sputtering and is then patterned by photolithographic and etching processes using a first mask, to form a black matrix 104, as shown in FIG. 5A. The black matrix 104 may be composed of a material such as chrome (Cr) or other suitable material.

Then, a color filter 106 is formed by in-plane printing (hereinafter, referred to simply as "IPP") using a soft mold, which consists of a red color filter R, a green color filter G, and a blue color filter B.

Figure 5B:
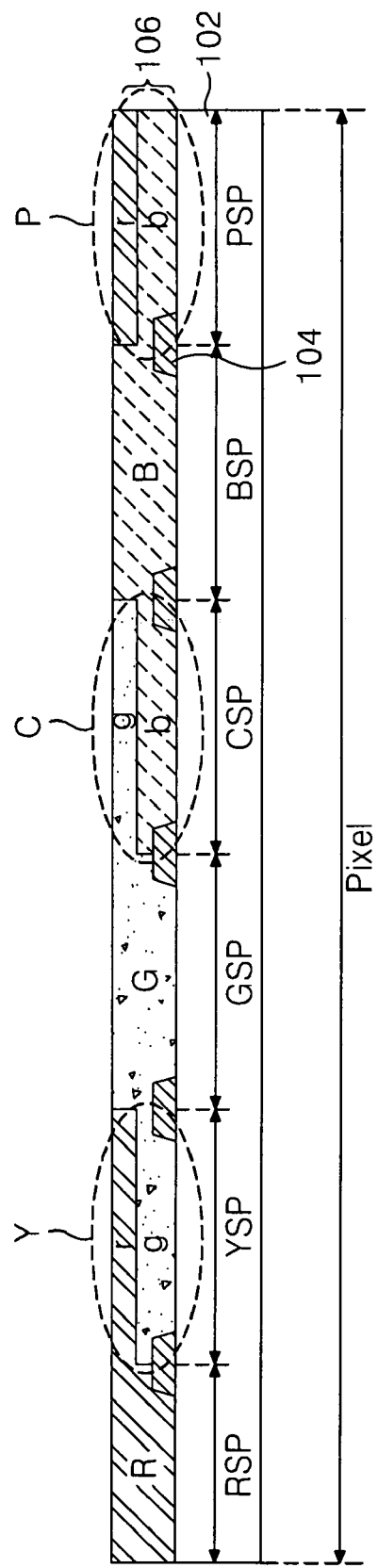

Hereinafter, referring to FIGS. 6A through 6H, the fabrication process of the color filter 106 shown in FIG. 5B will be illustrated in detail.

First, a liquid-based blue color resin 106a is applied over the entire surface of the upper substrate 102 including the black matrix 104 by an application method such as spin or spinless coating using a color resin applicator 210.

The blue color resin 106a includes a blue color resin to yield blue, as well as an activator and an initiator.

Figure 6B:
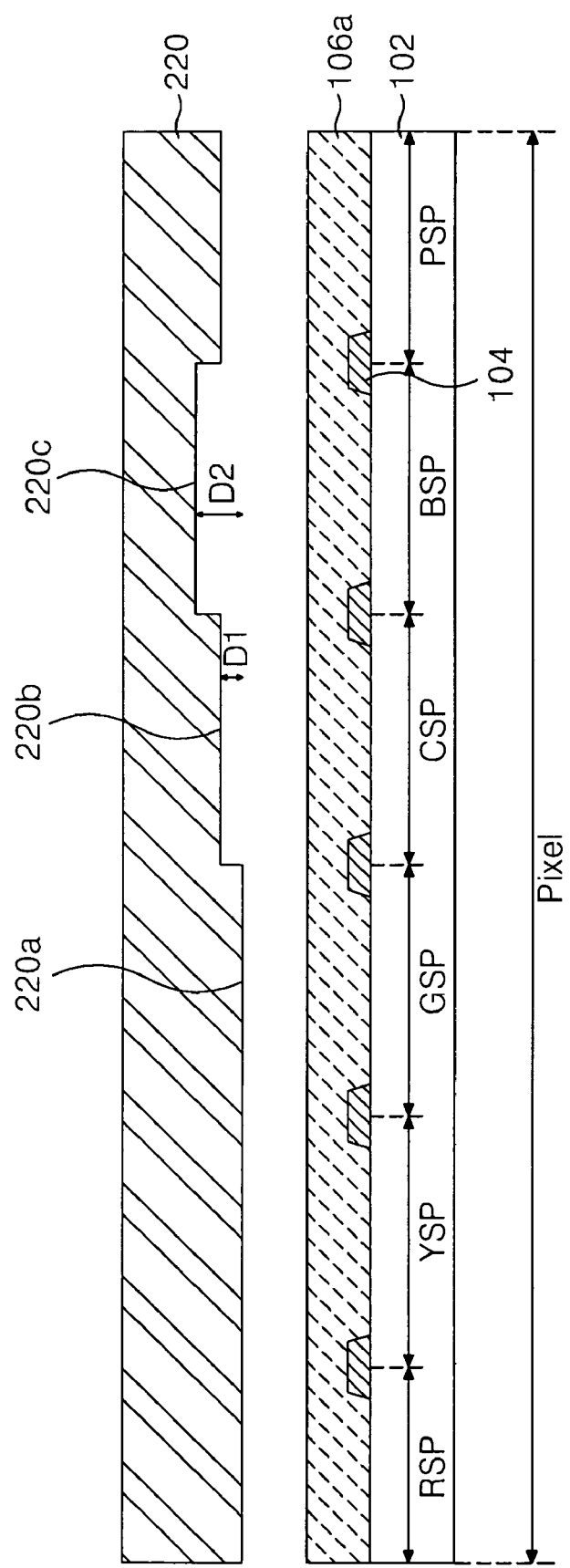
FIGS. 6A through and including 6H are sectional views sequentially illustrating the fabrication process of the color filter illustrated in FIG. 5B.
Figure 6C:
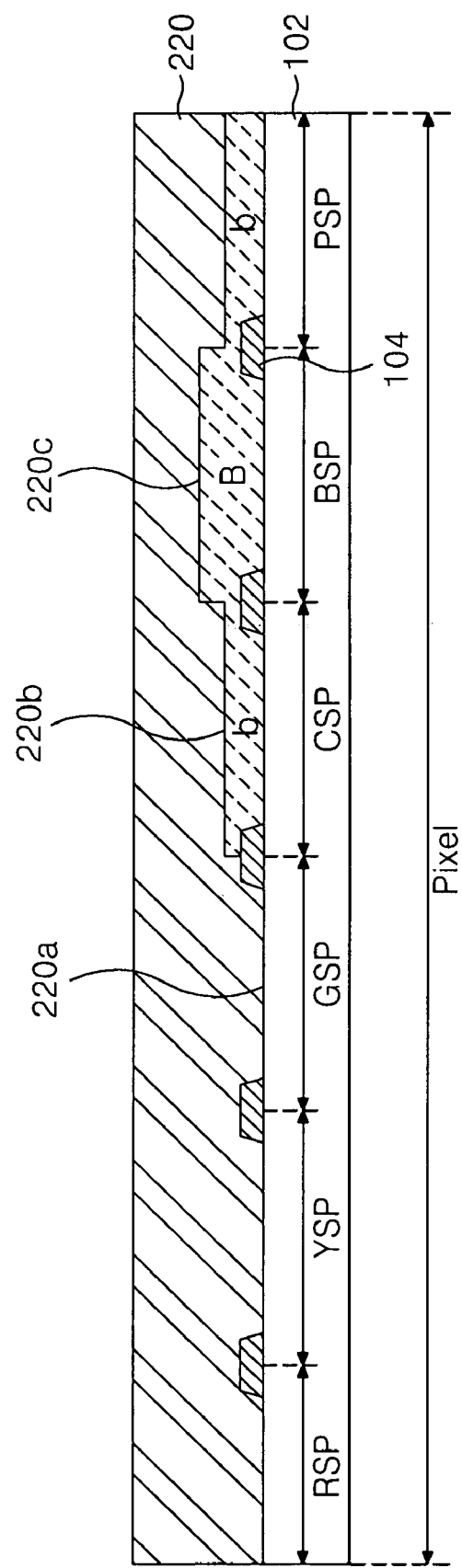

A first soft mold 220 is aligned over the upper substrate 102 including the resulting structure, as shown in FIG. 6B. The first soft mold 220 has a base side 220a, a first concave side 220b depressed to a first depth D1 from the base side 220a, and a second concave side 220c depressed to a second depth D2 from the base side 220a. The second concave side 220c is between two first concave sides 220b. The base side 220a faces a region corresponding to the red sub pixel RSP, the yellow sub pixel YSP and the green sub pixel. The first concave side 220b faces a region corresponding to the cyan sub pixel CSP and the pink sub pixel PSP. The second concave 220c faces a region corresponding to the blue sub pixel BSP. The second depth D2 is approximately twice as high as the first depth D1. The first soft mold 220 is composed of a highly elastic rubber material, e.g., a polydimethylsiloxane (PDMS) resin, a polyurethane acrylate (PUA) resin, or a cross-linked novolac resin or other suitable material.

The blue color resin 106a is pressed by a pressure comparable to the weight of the first soft mold 220 for a predetermined period, and at the same time, is subjected to curing. For example, the blue color resin 106a is simultaneously subjected to pressure and UV curing for 10 minutes to 2 hours.

The blue color resin 106a shifts to the space provided by the first concave side 220b and the second concave side 220c of the first soft mold 220, because of not only the capillary force generated by the pressure between the first soft mold 220 and the upper substrate 102, but also because of the repulsive force between the first soft mold 220 and the blue color resin 106a. As a result, as shown FIG. 6C, the blue color resin 106a is located in the space provided by the first concave side 220b and the second concave side 220c.

Figure 6D:
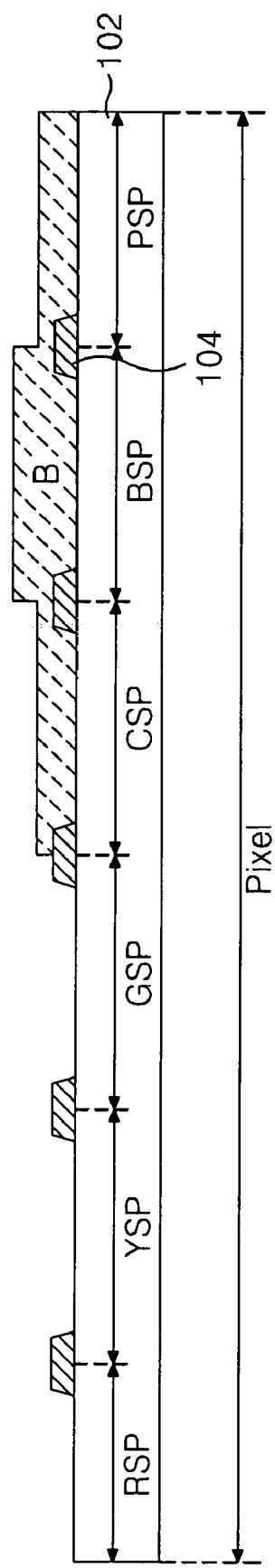

When the first soft mold 220 is separated from the upper substrate 102, the blue color filter B is formed in the pattern that is reverse-transferred to the space provided by the first concave side 220b and the second concave side 220c, and furthermore, a dummy blue color filter "b" is formed which extends from the blue color filter B and is thinner than that of the blue color filter B, as shown in FIG. 6D. The blue color filter B is arranged in a region corresponding to the blue sub pixel BSP, and the dummy blue color filter "b" is arranged in a region corresponding to the pink sub pixel PSP and the cyan sub pixel CSP, both of which are adjacent to the blue sub pixel BSP.

A liquid-based green color resin 106b is applied over the entire surface of the upper substrate 102 including the blue color filter B and the dummy blue color filter "b" by an application method such as spin or spinless coating using a color resin applicator. The liquid-based green color resin 106a includes a green color resin to yield green, as well as an activator and an initiator.

A second soft mold 230 is aligned over the upper substrate 102 including the resulting structure, as shown in FIG. 6E. The second soft mold 230 has a base side 230a, a first concave side 230b depressed to a first depth D1 from the base side 230a, and a second concave side 230c depressed to a second depth D2 from the base side 230a.

The base side 230a faces a region corresponding to the red sub pixel RSP. The first concave side 230b faces a region corresponding to the yellow sub pixel YSP and the pink sub pixel PSP, and the second concave side 230c faces a region corresponding to the blue sub pixel BSP, the cyan sub pixel CSP and the green sub pixel GSP. The second depth D2 is approximately twice that of the first depth D1. The second soft mold 230 may be composed of the same material as the first soft mold 220.

The green color resin 106b is pressed by the weight of the second soft mold 230 for a predetermined period, and at the same time, is subjected to curing. For example, the green color resin 106b is simultaneously subjected to pressing and UV curing for 10 minutes to 2 hours.

Figure 6F:
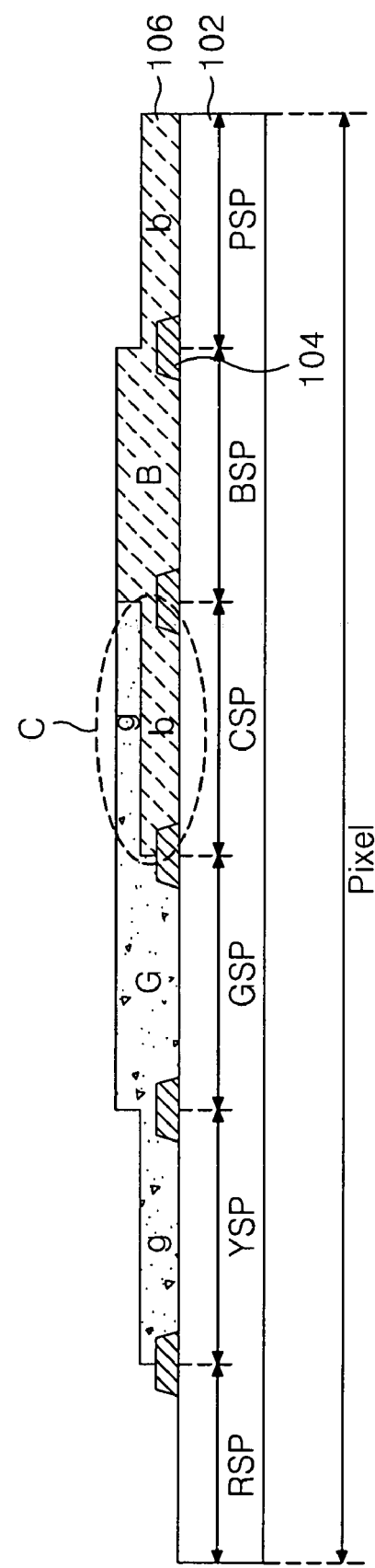

The green color resin 106b shifts to the space provided by the first concave side 230b and second concave side 230c of the second soft mold 230, because of not only the capillary force generated by the pressure between the second soft mold 230 and the upper substrate 102, but also because of the repulsive force between the second soft mold 230 and the green color resin 106b. As a result, the green color resin 106b is located into the space provided by the first concave side 230b and the second concave side 230c. When the second soft mold 230 is separated from the upper substrate 102, the green color filter G is formed in the pattern that is reverse-transferred to the space provided by the first concave side 230b and the second concave side 230c, and furthermore, a dummy green color filter "g" is formed which extends from the green color filter G and is thinner than that of the green color filter G, as shown in FIG. 6F. The green color filter G is arranged in a region defined by the green sub pixel GSP, and the dummy green color filter "g" is arranged in a region provided by the yellow sub pixel YSP and the cyan sub pixel CSP, both of which are adjacent to the green sub pixel GSP. Accordingly, the cyan color filter C is formed by overlapping the dummy green color filter "g" with the dummy blue color filter "b" on the cyan sub pixel CSP.

A liquid-based red color resin 106c is applied over the entire surface of the upper substrate 102 including the cyan color filter C, the blue color filter B, and the others by an application method such as spin or spinless coating using a color resin applicator. The liquid-based red color resin 106c includes a red color resin to yield a red color, as well as an activator and an initiator.

A third soft mold 240 is aligned over the upper substrate 102 including the resulting structure, as shown in FIG. 6G. The third soft mold 240 has a base side 240a, and a first concave side 240b depressed to a second depth D2 from the base side 240a. The first concave side 240b faces a region corresponding to all of the sub pixels. The third soft mold 240 may be composed of the same material as the first soft mold 220.

The red color resin 106c is pressed by a pressure comparable to the weight of the third soft mold 240 for a predetermined period, and at the same time, is subjected to curing. For example, the red color resin 106c is simultaneously subjected to pressing and UV curing for 10 minutes to 2 hours.

Figure 6H:
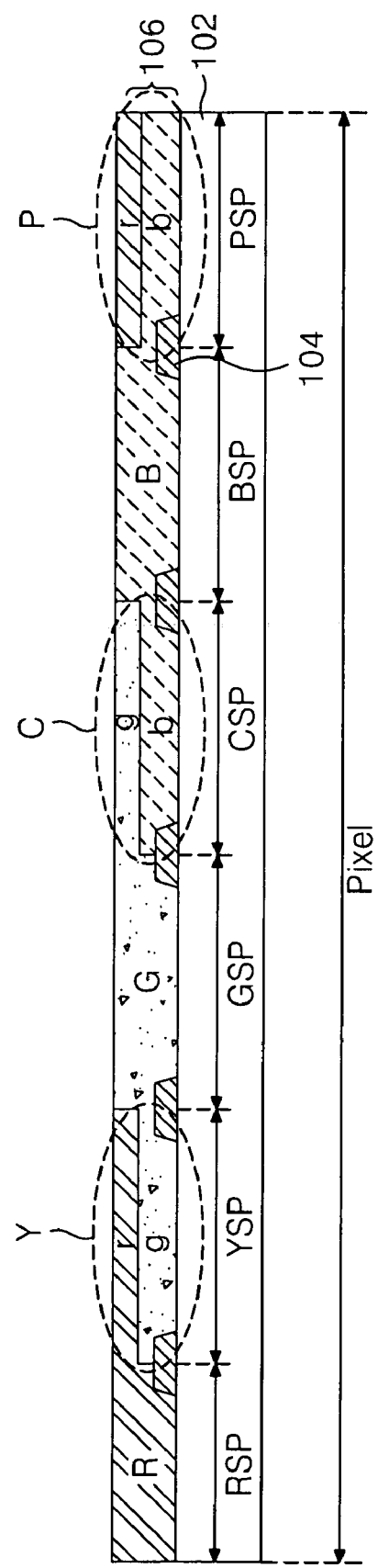

The red color resin 106c shifts to the space provided by the first concave 240b of the third soft mold 240, because of not only the capillary force generated by the pressure between the third soft mold 240 and the upper substrate 102, but also because of the repulsive force between the third soft mold 240 and the red color resin 106c. As a result, the red color resin 106c is arranged into the space provided by the first concave side 240b. When the third soft mold 240 is separated from the upper substrate 102, the red color filter R is formed in the pattern that is reverse-transferred to the space provided by the first concave side 240b, and furthermore, a dummy red color filter "r" is formed which extends from the red color filter R and is thinner than that of the red color filter R, as shown in FIG. 6H. The red color filter R is arranged in a region corresponding to the red sub pixel RSP, and the dummy red color filter "r" is arranged in a region corresponding to the yellow sub pixel YSP and the pink sub pixel PSP, both of which are adjacent to the red sub pixel RSP. Accordingly, a yellow color filter Y is formed by overlapping the dummy green color filter "g" with the dummy red color filter "r" on the yellow sub pixel YSP. In addition, a pink color filter P is formed by overlapping the dummy blue color filter "b" with the dummy red color filter "r" on the pink sub pixel PSP.

As a result, the color filter 106 is finally fabricated, which consists of the red sub pixel RSP, the green sub pixel GSP, the blue sub pixel BSP, the cyan sub pixel CSP, the yellow sub pixel YSP and the pink sub pixel PSP.

In the process of manufacturing the color filter as illustrated in conjunction with FIGS. 6A to 6H, as an embodiment, blue, green and red color filters are sequentially formed. However, there is no restriction as to the formation sequence of blue, green and red color filters B, G and R. In the processes in conjunction with FIG. 3 and FIGS. 6A to 6H, only one or two color filters selected from a yellow color filter Y, a cyan color filter C and a pink color filter P may be formed.

The color filter 106 may be formed by an imprinting process employing application of an additional mechanical pressure, instead of the IPP process using a soft mold.

Figure 5C:
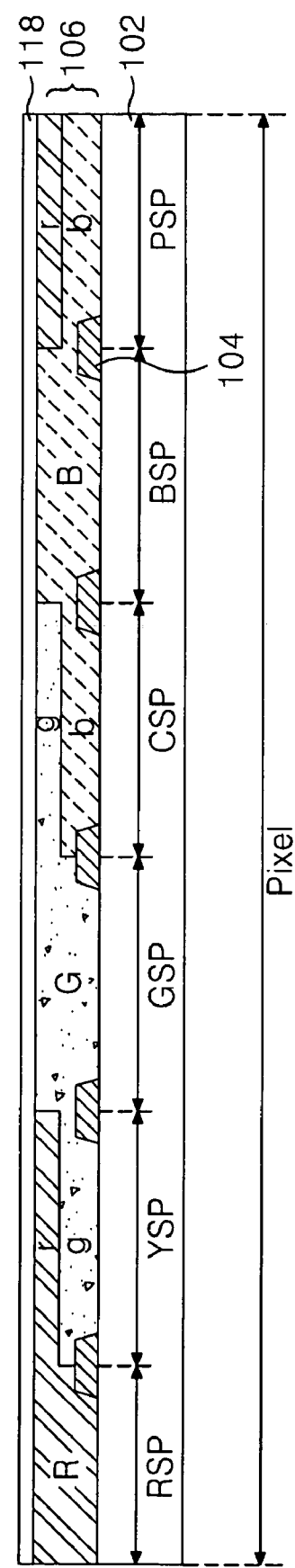

A transparent conductive material is deposited over the entire surface of the upper substrate 102, where the color filter 106 is formed, to form a common electrode 118, as shown in FIG. 5C.

Figure 5D:
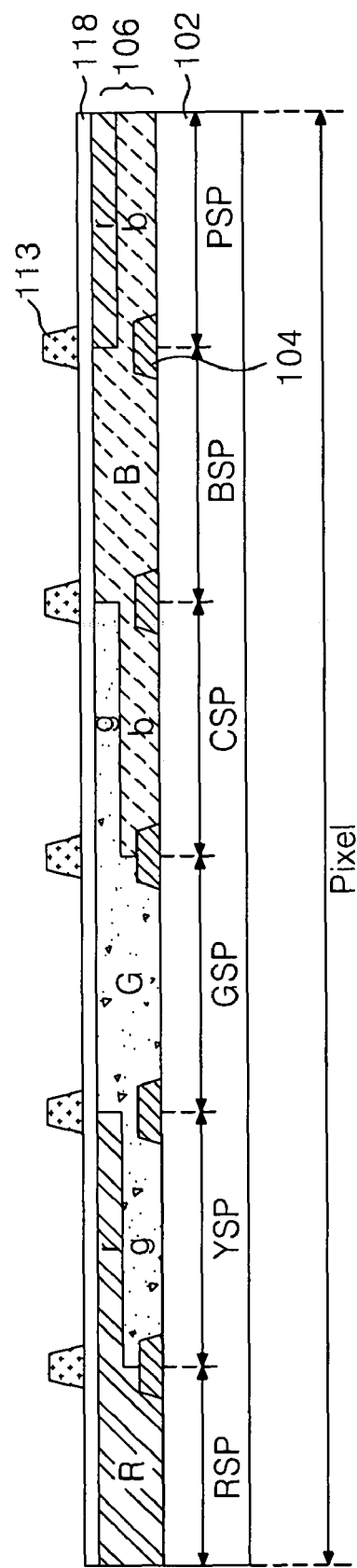

An organic or inorganic insulating material is deposited on the upper substrate 102, where the common electrode 118 is formed, and is then patterned by photolithographic and etching processes using a second mask, to form a column spacer 113, as shown in FIG. 5D. The column spacer 113 may also be formed by IPP or imprinting or other suitable process.

The thin film transistor array substrate 180, which includes the thin film transistor 107, the pixel electrode 116, and other structures, is formed by the process which is different from that of the color filter array substrate 170. The color filter array substrate 170 and the thin film transistor array substrate 180 are then joined and a liquid crystal 152 is then inserted into the space between the two substrates, thereby forming a liquid crystal display panel 190, as shown in FIG. 3.

As such, the method for fabricating a liquid crystal display panel according to the present invention employs an IPP or imprinting process to form the color filter, thus omitting exposure and development processes and eliminating the necessity of expensive equipment such as exposure equipment. Accordingly, it is possible to simplify a fabrication process and reduce fabrication costs.

Further, the method for forming the color filter, which consists of a red sub pixel RSP, a green sub pixel GSP, a blue sub pixel BSP, a cyan sub pixel CSP, a yellow sub pixel YSP and a pink sub pixel PSP, using the IPP or imprinting process is readily applicable to not only twisted nematic (TN) mode liquid crystal display panels, but also in-plane switching (IPS) mode liquid crystal display panels, electrical controlled birefringence (ECB) liquid crystal display panels, and furthermore, vertical alignment (VA) liquid crystal display panels.

As apparent from the foregoing, the liquid crystal display panel of the present invention and the method for fabricating the same employ an IPP or imprinting process to form a color filter, thus omitting exposure and development processes and eliminating the necessity of expensive equipment such as exposure equipment. Accordingly, it is possible to simplify a fabrication process and reduce fabrication costs.

Without additional costs, it is possible to form a color filter which further includes at least one selected from a yellow color filter Y, a cyan color filter C, and a pink color filter P, in addition to a red color filter R, a green color filter G and a blue color filter B. As a result, the liquid crystal display panel can exhibit improved color reproducibility and thus realize superior image quality, as compared to a related art liquid crystal display panel in which an image is produced by a combination of R, G and B color filters only.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display panel comprising:
   a color filter array substrate including a black matrix to define a plurality of pixel regions and a plurality of color filters arranged in the pixel regions on a substrate,
   wherein each of the color filters includes a first color filter, a second color filter and a third color filter, each of the color filters yielding a different color; and at least one selected from a fourth color filter yielding a mixed color of the first and second color filters, a fifth color filter yielding a mixed color of the second and third color filters, and a sixth color filter yielding a mixed color of the first and third color filters, and
   wherein the fourth color filter includes a dummy first color filter and a dummy second color filter, the dummy first color filter extending from the first color filter and thinner than that of the first color filter, and the dummy second color filter extending from the second color filter, thinner than that of the second color filter, and overlapping the dummy first color filter,
   the fifth color filter includes a dummy second color filter and a dummy third color filter, the dummy second color filter extending from the second color filter and thinner than that of the second color filter, and the dummy third color filter extending from the third color filter, thinner than that of the third color filter, and overlapping the dummy second color filter, and
   the sixth color filter includes a dummy first color filter and a dummy third color filter, the dummy first color filter extending from the first color filter and thinner than that of the first color filter, and the dummy third color filter extending from the third color filter, thinner than that of the third color filter, and overlapping the dummy first color filter.

2. The liquid crystal display panel according to claim 1, wherein the fourth color filter is arranged between the first and second color filters, the fifth color filter is arranged between the second and third color filters, and the sixth color filter is arranged between the first and third color filters.

3. The liquid crystal display panel according to claim 1, wherein the dummy first color filter, the dummy second color filter and the dummy third color filter are about half the thickness of the first color filter, the second color filter and the third color filter, respectively.

4. The liquid crystal display panel according to claim 1, wherein the first color filter yields red, the second color filter yields green, the third color filter yields blue, the fourth color filter yields yellow, the fifth color filter yields cyan and the sixth color filter yields pink.

5. The liquid crystal display panel according to claim 1, wherein the color filter array substrate further includes;
    a common electrode arranged on the color filter, and
    at least a spacer arranged on the common electrode.

6. The liquid crystal display panel according to claim 1, further comprising:
    a thin film transistor array substrate joined to the color filter array substrate such that liquid crystal is interposed between the two substrates,
    wherein the thin film transistor array substrate includes a thin film transistor, and a pixel electrode contacting the thin film transistor.

* * * * *